United States Patent
Wu et al.

(10) Patent No.: US 8,520,987 B2
(45) Date of Patent: Aug. 27, 2013

(54) METHOD OF FABRICATING AN OPTICAL TRANSFORMER

(75) Inventors: Yi-Ching Wu, Hsinchu County (TW); Shuenn-Jeng Chen, Hsinchu County (TW)

(73) Assignee: United Microelectronics Corp., Science-Based Industrial Park, Hsin-Chu (TW)

( * ) Notice: Subject to any disclaimer, the term of this patent is extended or adjusted under 35 U.S.C. 154(b) by 652 days.

(21) Appl. No.: 12/709,516

(22) Filed: Feb. 22, 2010

(65) Prior Publication Data

US 2011/0206315 A1   Aug. 25, 2011

(51) Int. Cl.
*G02B 6/12* (2006.01)
*H01L 21/00* (2006.01)

(52) U.S. Cl.
USPC .............................................. 385/14; 438/31

(58) Field of Classification Search
USPC .............................................. 385/14; 438/31
See application file for complete search history.

(56) References Cited

U.S. PATENT DOCUMENTS

| | | | |
|---|---|---|---|
| 6,580,850 B1 * | 6/2003 | Kazarinov et al. | 385/28 |
| 6,687,446 B2 | 2/2004 | Arakawa | |
| 2005/0023145 A1 * | 2/2005 | Cohen et al. | 205/118 |
| 2011/0097033 A1 | 4/2011 | Su et al. | |
| 2011/0115040 A1 | 5/2011 | Su et al. | |

* cited by examiner

*Primary Examiner* — Ryan Lepisto
*Assistant Examiner* — Jerry Blevins
(74) *Attorney, Agent, or Firm* — Winston Hsu; Scott Margo (57) ABSTRACT

A method of fabricating an optical transformer is provided. A substrate is provided first, wherein the substrate includes a first region and a second region. Then a first material layer is formed on the substrate, and the portion of the first material layer other than in the first region is removed. Then a second material layer is formed on the substrate, and the portion of the second material layer in the first region and the second region is removed. Lastly, a first conductive layer is formed on the substrate and the portion of the first conductive layer other than in the second region is removed to make the first material layer, the second material layer and the first conductive layer have the same height such that the first material layer becomes a part of the optical transformer.

22 Claims, 6 Drawing Sheets

METHOD OF FABRICATING AN OPTICAL TRANSFORMER

BACKGROUND OF THE INVENTION

1. Field of the Invention

The invention relates to a method of fabricating an optical transformer, especially to a method that can simultaneously form an optical transformer and a metal interconnection system.

2. Description of the Prior Art

As technology progresses, semiconductor chips generated by a variety of semiconductor processes are pervasive in electronic devices, becoming necessaries in daily life. In addition to raising the integrity of semiconductor devices onto a chip so as to being smaller and compact, the current development trend also hopes to integrate various areas or fields of technology onto the semiconductor chip, enabling the chip to have different functions, for example, the combination of mechanical systems to be a micro-electrical system (MEMS), the combination of bio-technology to be a DNA chip, or the combination of optical fields to be an optical transmission system. Because the materials in various fields are of different physical nature, so the integration of those materials into existing manufacturing processes of semiconductor technology is an anxious problem to resolve.

Taking the optical transmission system for example, in order to convert the optical signal into existing semiconductor electrical signal, a variety of optical devices are needed, for instance, an optical waveguide, an optical transformer, an optical modulator, a photo-detector or other devices that are able to transmit, to separate, to combine optical signals, or to process electrical/optical switching. An optical transformer can receive outside optical signals and, by its special material or three-dimensional shape, can couple the signals into the optical waveguide. An optical waveguide can transmit the optical signals in conventional semiconductor medium and by using different materials of different refractive indices between the transmission medium and the coating medium, the light transmission integrity can be retained. Lastly, the optical signals are converted into a general electrical current message and provided to electronic devices for the subsequent signal processing.

Conventional optical transformers are usually formed in advance, and then each of the transformers is bonded onto the semiconductor substrate respectively. In detail, after forming the light waveguide, the already-formed light transformer is aligned and bonded onto the light waveguide by using an adhesive. However, the adhesive can easily contract when curing, and because of the different spreading effects due to different compositions of the adhesive, the coupling effect between the light waveguide and the light transformer will decrease, affecting its transmission quality. In addition, the current trend of development in optical transmission systems is to integrate it into the existing semiconductor substrate, such as a semiconductor substrate including a CMOS disposed therein. Therefore, effectively integrating the optical components and semiconductor components by using existing semiconductor technologies to form an optoelectronic structure on the substrate remains a problem to be solved.

SUMMARY OF THE INVENTION

The present invention therefore provides a method of fabricating an optical transformer to efficiently integrate the optical transformer fabricating method into existing semiconductor manufacturing methods. Firstly, a substrate which includes a first region and a second region is provided. Then a first material layer is formed on the substrate, and the portion of the first material layer other than the first region is removed. Then a second material layer is formed on the substrate, and the portion of the second material layer in the first region and the second region is removed. Lastly, a first conductive layer is formed on the substrate and the portion of the first conductive layer other than the second region is removed to make the first material layer, the second material layer and the first conductive layer have the same height such that the first material layer becomes a part of the optical transformer.

According to the method in the present invention, two different material layers and one conductive layer can be formed in the same level space. By using the method, it is available to form the metal interconnection system and the optical transformer simultaneously. Therefore the integration of an optical transformer fabrication method into a conventional MOS fabrication method can be achieved, increasing the manufacturing efficiency and the reliability of products.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
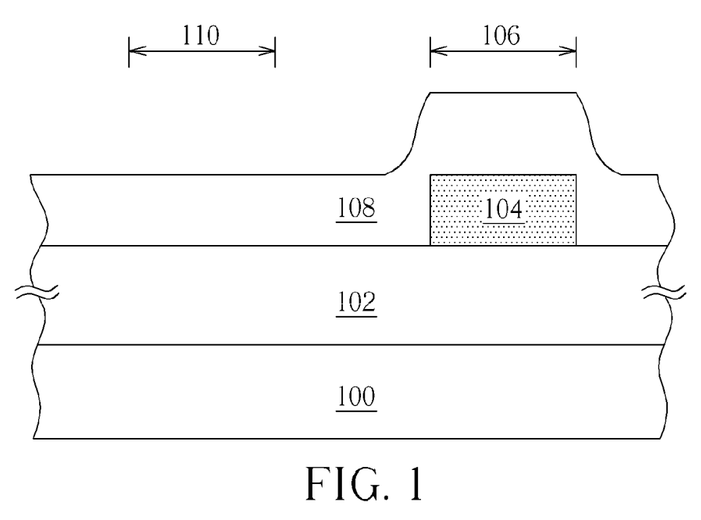
FIG. 1 to FIG. 5 illustrate the first embodiment of the method of forming an optical transformer in the present invention.

Please refer to FIG. 1 to FIG. 5, illustrating the method of forming an optical transformer in the present invention. As shown in FIG. 1, a substrate 100 is provided. A first region 106 is defined on the substrate 100. Then, at least a dielectric layer 102 is formed on the substrate 100. A first material layer 104 is formed comprehensively on the top of the dielectric layer 102. Then the first material layer 104 is patterned, for example, a photo-etching-process (PEP) is provided to reserve the first material layer 104 in the first region 106 but remove the first material layer 104 other than the first region 106. Subsequently, a second material layer 108 is formed comprehensively on the substrate 100, for example, by using a CVD process to form the second material layer 108 comprehensively on the dielectric layer 102 and the patterned first material layer 104. The first material layer 104 and the second material layer 108 are preferably selected from dielectric layers with different etching selectivity. For example, the first material layer 104 can be silicon nitride and the second material layer 108 can be silicon oxide.

Figure 2:
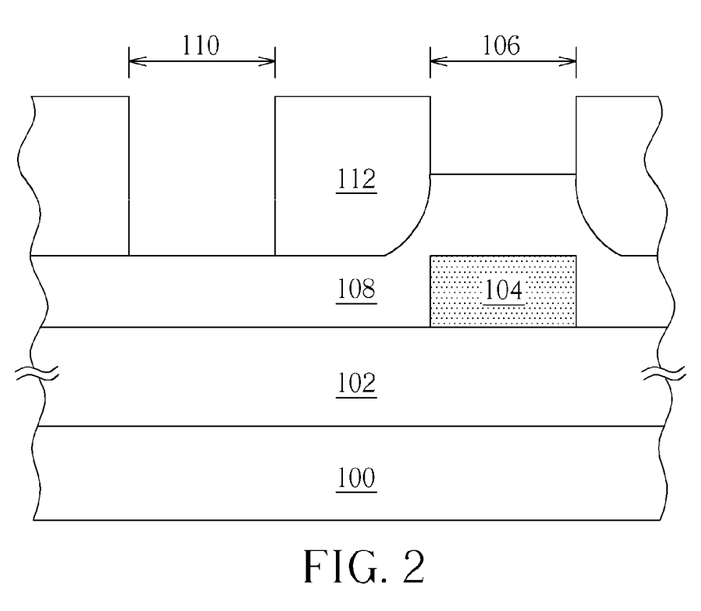

As shown in FIG. 2, a second region 110 is defined on the substrate 100. The first region 106 and the second region no do not overlap. Then a PEP is provided. For instance, a photoresist layer 112 is formed on the second material layer 108, and then a lithographic process is provided to remove the photoresist layer 112 in the first region 106 and in the second region 110. By using the patterned photoresist layer 112 as a mask, an etching process is provided to simultaneously remove the second material layer 108 in the first region 106 and the second region no, so as to form the structure in FIG. 3.

Figure 4:
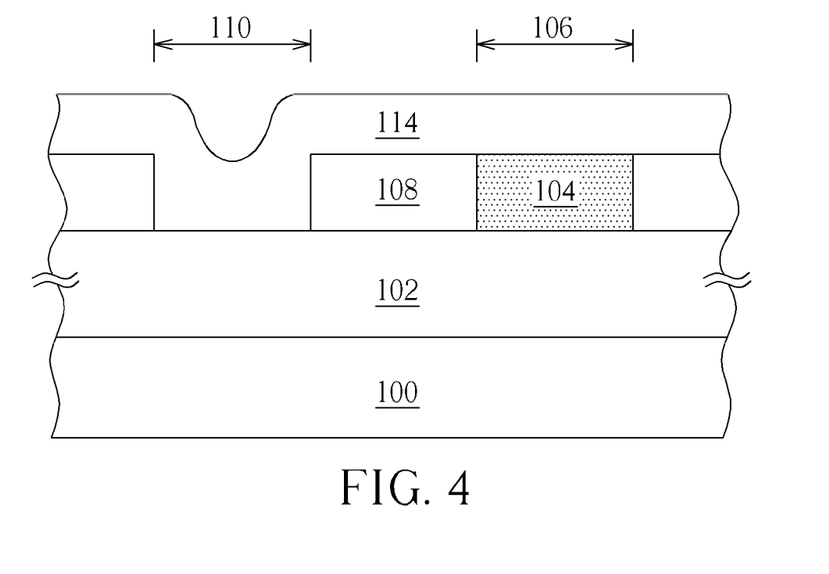
Figure 5:
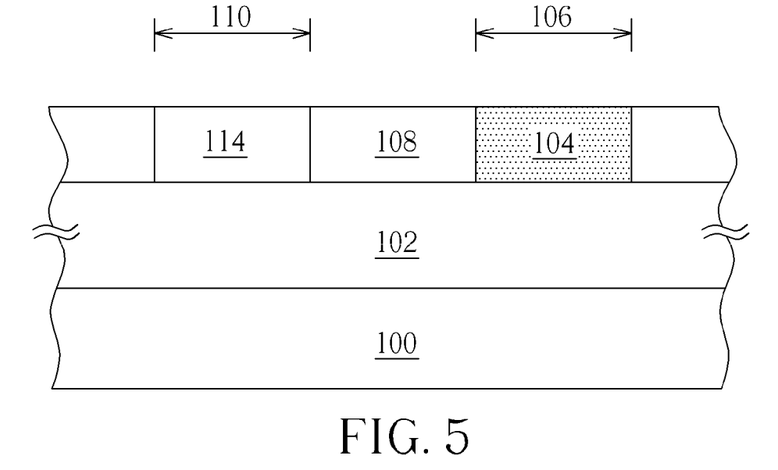

As shown in FIG. 4, a first conductive layer 114 is formed comprehensively on the substrate 100. The first conductive layer 114 is formed on the first material layer 104 and the second material layer 108, and is filled into the second region no. The first conductive layer 114 filled in the second region no is higher than adjacent second material layer 108. As shown in FIG. 5, a planarization process is provided to make the first material layer 104 and the second material layer 108 have the same height. Consequently, the semiconductor structure with different dielectric layers (the first material layer 104 and the second material layer 108) and a first conductive layer 114 in the same level of space is thus provided in the present invention.

The first embodiment aforementioned is to use one PEP to simultaneously remove the second material layer 108 in the first region 106 and the second region no (please refer to FIG. 4). However, as shown in FIG. 1, when forming the second material layer 108, it will be formed conformally along the first material layer 104. There is therefore a part of second material layer 108 that slightly protrudes adjacent to the edge of the first region 106. And in FIG. 2, the slightly protruding second material layer 108 is not located in the first region 106 and is not removed in the etching process. It is therefore a small part of second material layer 108 that remains in the place marked by the dotted line B. Though the remaining second material layer 108 may be removed in the subsequent planarization process in FIG. 5, the removal efficiency is not satisfactory. In order to prevent such situation, a second embodiment and a third embodiment are provided to avoid residual second material layer 108 such as is shown in dotted line B. Comparing the simultaneous removal of the second material layer 108 in the first region 106 and the second region no in the first embodiment, in the second embodiment and the third embodiment, the second material layer 108 in the first region 106 is removed at first, and the second material layer 108 in the second region 108 is then removed.

Figure 3:
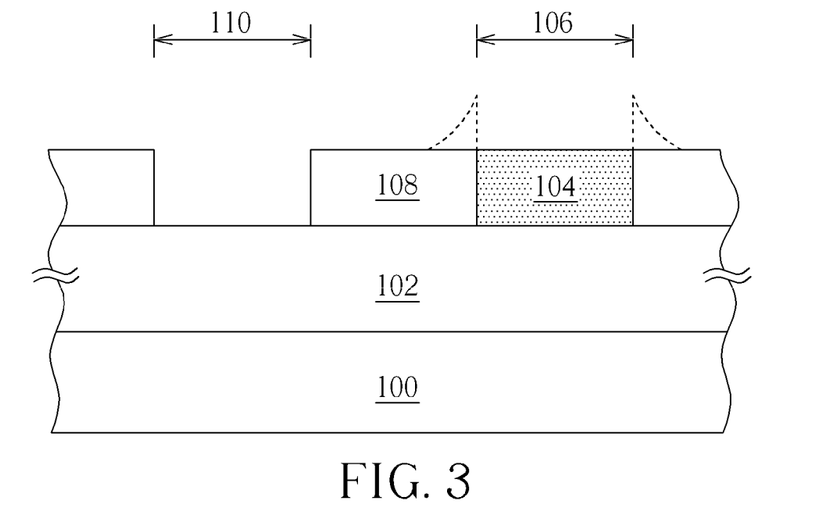
Figure 6:
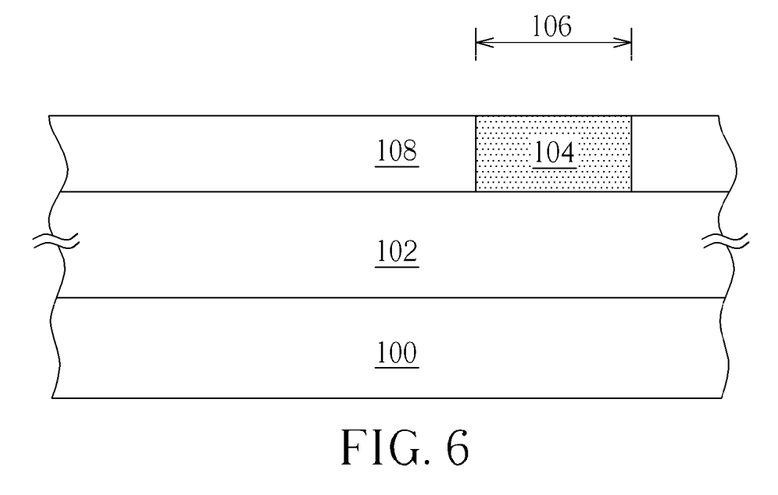
FIG. 6 to FIG. 7 illustrate the second embodiment of the method of forming an optical transformer in the present invention.
Figure 7:
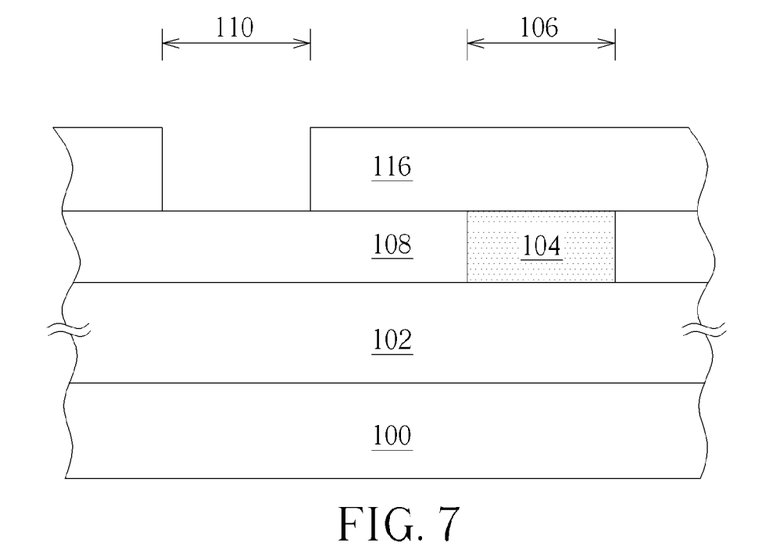

In the second embodiment, please mentally replace FIG. 2 in the first embodiment with FIG. 6 and FIG. 7. For example, when finishing the step in FIG. 1, please continue to FIG. 6. A planarization process is provided, such as a chemical mechanical polish (CMP) process, to remove the second material layer 108 above the first material layer 104, that is, to remove the second material layer 108 in the first region 106 to make the first material layer 104 and the second material layer 108 have the same height. Then, as shown in FIG. 7, a PEP is provided. For example, a photoresist layer 116 is formed comprehensively on the substrate 100, and a lithographic process is provided to remove the photoresist layer 116 in the second region no. By using the patterned photoresist layer 116 as a mask, an etching process is provided to remove the second material 108 in the second region 110. Consequently, the structure can be continued as shown in FIG. 3, and the steps in FIG. 4 and FIG. 5 are further provided, so the semiconductor structure can be obtained. Because of the planarization process in FIG. 6, the slightly protruding second material layer 108 can be removed, avoiding the protruding structure marked by dotted B in FIG. 3.

Figure 8:
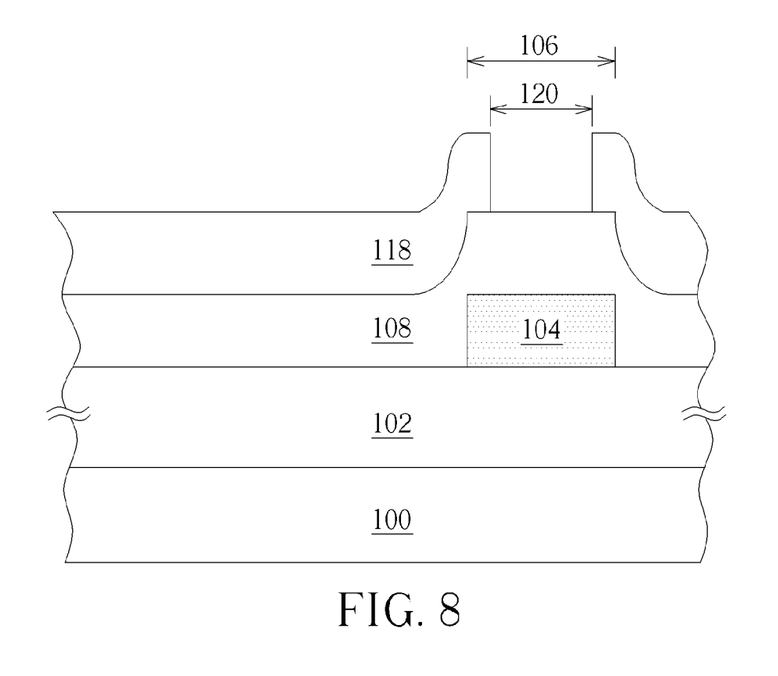
FIG. 8 to FIG. 9 illustrate the third embodiment of the method of forming an optical transformer in the present invention.
Figure 9:
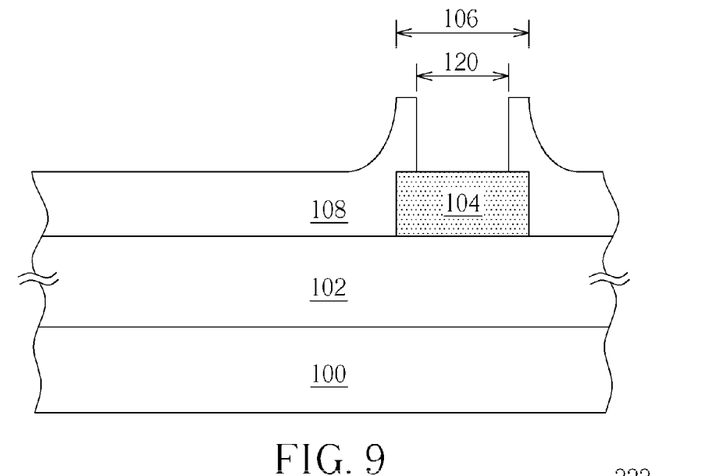

In the third embodiment, please mentally replace FIG. 2 in the first embodiment with FIG. 8, FIG. 9 and FIG. 7. When finishing the step in FIG. 1, please continue to FIG. 8. A third region 120 is defined on the substrate 100, wherein the third region 120 is located within the first region 106. That is, the area of the third region 120 is smaller than that of the first region 106. Subsequently, a PEP is provided. For example, a photoresist layer 118 is formed comprehensively on the substrate 100, and a lithographic process is provided to remove the photoresist layer 118 in the third region 120. Then an etching process is provided to remove the second material layer 108 in the third region 120, and remove the photoresist layer 118. The structure in FIG. 9 is thus obtained. Because the PEP process only removes the second material layer 108 in the third region 120, there is still some protruding part of the second material layer 108 on the first material layer 104. Lastly, a planarization process is provided, such as a CMP process, to remove the "protruding" part of the second material layer 108, making the first material layer 104 and the second material 108 have the same height. The structure in FIG. 6 is thus obtained. And the steps in FIG. 7, FIG. 3, FIG. 4 and FIG. 5 are thus provided so as to complete the semiconductor structure in the present invention. As the step in removing the second material layer 108 in the first region 106 is to firstly remove part of the second material layer 108 (the third region 120) and then to provide a planarization process, the intactness between the first material layer 104 and the second material layer 108 can be maintained, and the first material layer 104 and the second material layer 108 can have the same height.

Figure 10:
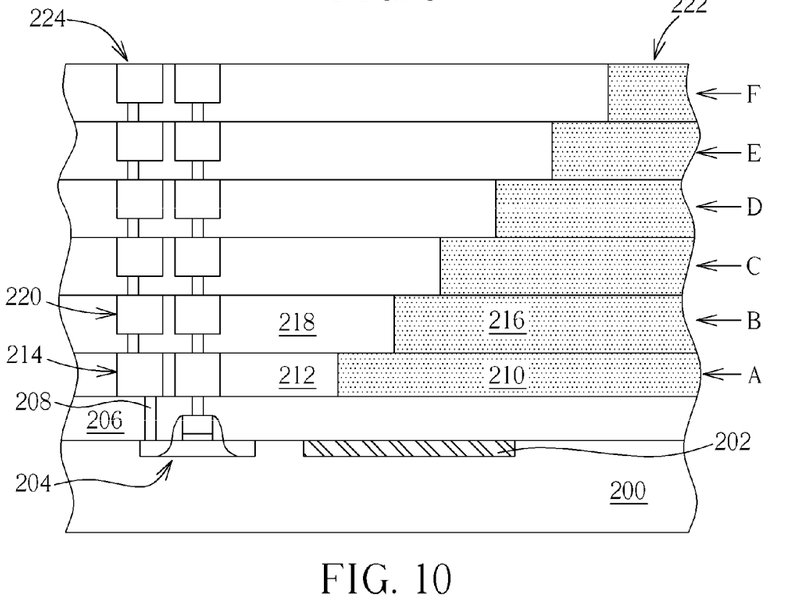
FIG. 10 illustrates a schematic diagram of simultaneous forming an optical transformer and a metal interconnection system.

Accordingly, by using the method in the first embodiment to the third embodiment provided in the present invention, two different dielectric layers (the first material layer 104 and the second material layer 108) and a metal layer (the first conductive layer 114) can be formed in the same level of space. When utilizing the method into an existing MOS fabrication method, it is available to form a dielectric layer to be an optoelectronic device such as a light transformer, and to form another dielectric layer to be an inter-metal-dielectric (IMD) layer, and to form a metal layer to be a metal interconnection system. Please refer to FIG. 10, illustrating the schematic diagram of simultaneously forming an optical transformer and a metal interconnection system. As shown in FIG. 10, a conventional semiconductor device 204 and a metal interconnection system 224 disposed thereabove are provided on the substrate 200. A waveguide 202 and an optical transformer 222 are disposed on the substrate 200 as well. The metal interconnection system 224 includes a first metal layer 214, a second metal layer 220 and a plurality of metal layers disposed thereabove, wherein the metal interconnection system 224 electrically connects downwardly to the semiconductor device 204, and upwardly to a contact pad (not shown), providing a signal input/output.

Figure 11:
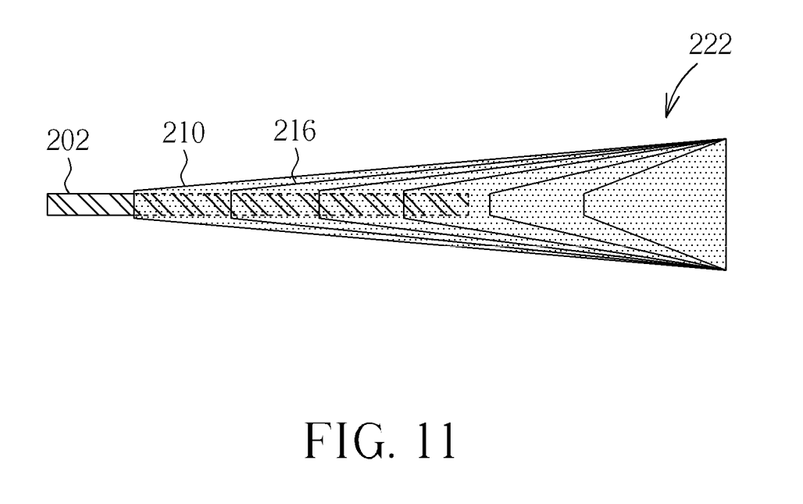
FIG. 11 illustrates a top view diagram of the step optical transformer structure in the present invention.

The optical transformer 222 includes a first dielectric layer 210, a third dielectric layer 216 and a plurality of dielectric layers disposed thereabove, forming a step structure which is shown in FIG. 11. FIG. 11 illustrates a top schematic diagram of the step optical transformer structure in the present invention. As shown in FIG. 11, the optical transformer 222 is formed from a plurality of dielectric layers, wherein the upper dielectric layer has a smaller dimension. Each dielectric layer has a tapered structure whose tapered end shrinks in the direction along the waveguide 202, thus forming a 3D tapered stacking structure. The optical signal can travel in the direction of arrow A in the optical transformer 222 and then couples downwardly to the waveguide 202. It is understood that the shape of the transformer 222 is not limited to the step structure but can be other 3D structures which is well known in the art and is not described.

Please again refer to FIG. 10. In the method of simultaneously forming the metal interconnection system 224 and the optical transformer 222 in the present invention, a substrate 200 is provided at first. Then a waveguide 202 and a semiconductor device 204 such as a MOS are formed in the substrate 200. Then an inter dielectric (ILD) layer 206 is formed on the semiconductor device 204 and a contact plug 208 is formed in the ILD layer 206 which electrically connects to the semiconductor device 204. Then, layer A to layer F above the ILD layer 206 can be fabricated by the method of the first to third embodiments in the present invention. As shown in FIG. 10, layer A to layer F includes a "one metal layer with two different dielectric layers" structure. For example, layer A includes the first dielectric layer 210, the second dielectric layer 212 and the first metal layer 214, which can be respectively compared to the first material layer 104, the second material layer 108 and the first conductive layer 114 in FIG. 5. So by using the aforementioned method and adjusting the scope of the first region 106 and the second region 110, the structure of layer A in FIG. 10 can be obtained. Next, the same method can be used to form the third dielectric layer 216, the fourth dielectric layer 218 and the second metal layer 220 of layer B. Similarly, layer C to layer F can be fabricated by repeating the aforementioned method. It is understood that layer A to layer F can be fabricated by the method of the first embodiment to the third embodiment arbitrarily. Besides, in the aforementioned method, the "metallization process" of the first conductive layer 114 is shown as a single-damascene process (please refer to FIG. 4 and FIG. 5). However, depending on different designs of the metal interconnection system 224, the "metallization process" in FIG. 4 and FIG. 5 can be replaced with a dual-damascene process.

Accordingly, the first dielectric layer 210 in layer A, the third dielectric layer 216 in layer B and their above dielectric layers become the optical transformer 222 with a step structure. The first metal layer 214, the second metal layer 220 and their above metal layers become the metal interconnection system 224. The second dielectric layer 212 and the fourth dielectric layer 218 become the MID layers. Consequently, the method in the present invention can combine a conventional metal interconnection system 224 fabrication method and the optical transformer 222 fabrication method by simultaneously forming the metal interconnection system 224 and the optical transformer 222 with a step structure.

As the shape of the transformer 222 is not limited to the step structure, it is also available to change the scope of the first region 106 to adjust the areas of each dielectric layer, making the optical transformer 222 have a different 3D structure. It is noted that, in order to prevent optical signal leakage to the outer world, the refractive index of the first dielectric layer 210 is greater than that of the second dielectric layer 212, and the refractive index of the third dielectric layer 216 is greater than that of the fourth dielectric layer 212. In the preferred embodiment of the present invention, the first dielectric layer 210 and the third dielectric layer 216 include the same material, such as silicon nitride. The second dielectric layer 212 and the fourth dielectric layer 218 include the same material, such as silicon oxide.

Among the aforementioned methods, integration of an optical transformer fabrication method into conventional MOS fabricating methods can be achieved. It is understood that the method in the present invention is not limited to forming the optical transformer but can be used to form other optoelectronic devices, or even a MEMS system. The method therefore is applicable in a variety of fields.

Those skilled in the art will readily observe that numerous modifications and alterations of the device and method may be made while retaining the teachings of the invention.

What is claimed is:

1. A method of fabricating an optical transformer, comprising:
    providing a substrate, wherein the substrate comprises a first region and a second region;
    forming a first material layer on the substrate;
    removing the first material layer other than in the first region;
    forming a second material layer on the substrate;
    removing the second material layer in the first region and in the second region;
    after removing the second material layer in the first region and the second region, forming a first conductive layer on the substrate; and
    removing the first conductive layer other than in the second region to make the first material layer, the second material layer and the first conductive layer have the same height such that the first material layer becomes a part of the optical transformer.

2. The method as in claim 1, further comprising forming a metal interconnection system, wherein the first conductive layer becomes a part of the metal interconnection system.

3. The method as in claim 1, wherein removing the second material layer in the first region, simultaneously removing the second material layer in the second region.

4. The method as in claim 3, wherein the step of removing the second material layer in the first region and in the second region comprising:
    forming a photoresist layer on the substrate;
    providing a lithographic process to remove the photoresist layer in the first region and in the second region; and
    providing an etching process to remove the second material layer in the first region and in the second region.

5. The method as in claim 1, wherein the step of removing the second material layer in the first region and in the second region comprising:
    removing the second material layer in the first region, and then removing the second material layer in the second region.

6. The method as in claim 5, wherein the step of removing the second material layer in the first region comprises a planarization process.

7. The method as in claim 5, wherein the step of removing the second material layer in the first region comprises a photo-etching-process.

8. The method as in claim 7, wherein the photo-etching-process comprises:
    forming a photoresist layer on the substrate;
    providing a lithographic process to remove the photoresist layer in a third region, wherein the third region is located within the first region;
    providing an etching process to remove the second material layer in the third region; and
    providing a planarization process to remove the second material layer in the first region.

9. The method as in claim 5, wherein the step of removing the second material layer in the second region comprises:
    forming a photoresist layer on the substrate;
    providing a lithographic process to remove the photoresist layer in the second region; and
    providing an etching process to remove the second material layer in the second region.

10. The method as in claim 1, wherein the step of removing the first conductive layer in the region other than in the second region comprises a planarization process.

11. The method as in claim 1, wherein the refractive index of the first material layer is greater than that of the second material layer.

12. The method as in claim 1, wherein the first material layer comprises silicon nitride.

13. The method as in claim 1, wherein the second material layer comprises silicon oxide.

14. The method as in claim 1, wherein after the step of removing the first conductive layer other than in the second region further comprises:
    defining a fourth region and a fifth region on the substrate;
    forming a third material layer on the substrate;
    removing the third material layer other than in the fourth region;
    forming a fourth material layer on the substrate;
    removing the fourth material layer in the fourth region and the fifth region;
    forming a second conductive layer on the substrate; and
    removing the second conductive layer other than in the fifth region.

15. The method as in claim 14, wherein the refractive index of the third material layer is greater than that of the fourth material layer.

16. The method as in claim 14, wherein the first material layer and the third material layer comprise the same material, and the second material layer and the fourth material layer comprise the same material.

17. The method as in claim 1, further comprising forming a waveguide in the substrate.

18. The method as in claim 17, wherein the waveguide and the first material layer partially overlap.

19. The method as in claim 1, before forming the first material layer further comprising:
    forming a semiconductor device on the substrate; and
    forming a inter dielectric layer on the semiconductor device.

20. The method as in claim 1, wherein the first region is not adjacent to the second region.

21. The method as in claim 14, wherein the third material layer is disposed on and partially overlapped with the first material layer.

22. A method of fabricating an optical transformer, comprising:
    providing a substrate, wherein the substrate comprises a first region and a second region;
    forming a first material layer on the substrate in the first region;
    forming a second material layer on the substrate covering the first material layer;
    removing the second material layer to expose the first material layer in the first region and forming an opening in the second region;
    forming a first conductive layer on the substrate filling into the opening and covering the first material layer and the second material layer; and
    removing the first conductive layer other than in the opening to make the first material layer, the second material layer and the first conductive layer have the same height such that the first material layer becomes a part of the optical transformer.

* * * * *